Feb. 4, 1969  W. H. STOUT  3,425,632
HOLLOW PIN SLIP COUPLER HAVING SPRINKLER HEAD
Filed Feb. 27, 1967
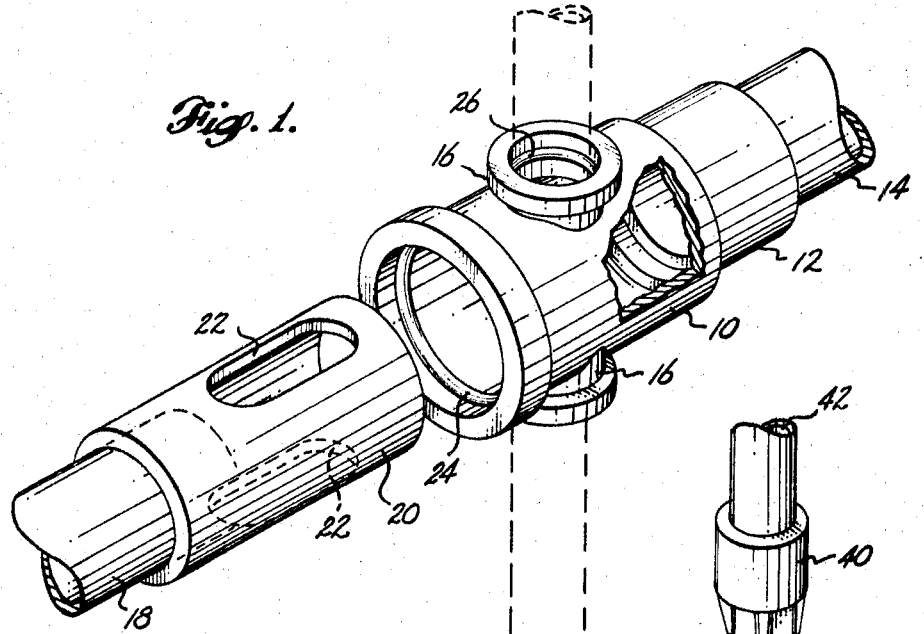
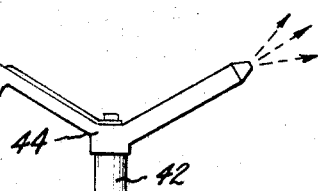
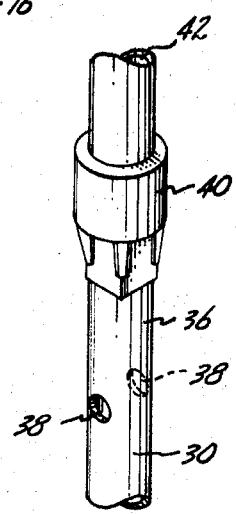
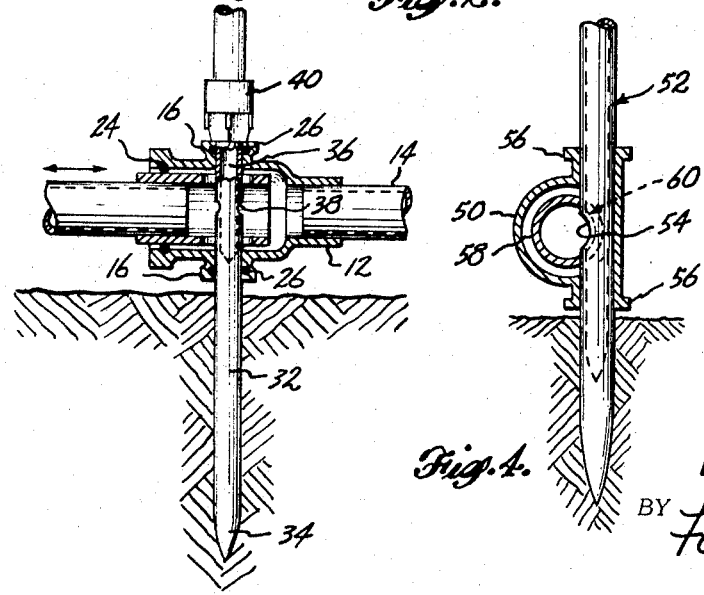
INVENTOR.
WILLIAM H. STOUT
BY Ford E. Smith
ATTORNEY

United States Patent Office 3,425,632
Patented Feb. 4, 1969

3,425,632
HOLLOW PIN SLIP COUPLER HAVING SPRINKLER HEAD
William H. Stout, 223 N. Jessup, Portland, Oreg. 97217
Filed Feb. 27, 1967, Ser. No. 618,903
U.S. Cl. 239—267         4 Claims
Int. Cl. A01g 25/02; B05b 1/20; F16l 41/00

ABSTRACT OF THE DISCLOSURE

A bell and spigot coupling for irrigation pipe having a pin traversing the parts and precluding relative rotation but received in an elongated opening in the spigot to permit relative longitudinal movement. The pin may be hollow and ported to receive and laterally conduct fluid delivered to the coupling.

The drawings

FIGURE 1 is an exploded perspective view of the slip coupler;

FIGURE 2 is an assembled view of the coupler with parts shown in cross-section for convenience of illustration;

FIGURE 3 is a perspective view of a conduit pin used in the slip coupler; and

FIGURE 4 is a cross-section view of an alternative form of slip coupler.

Background

Bell and spigot coupling in irrigation conduit are known. The parts are either joined by male-female threads or by quick-release fastening means. Attachment of lateral take-off pipes are usually by saddle fittings or by the use of T's. Generally no accommodation is provided at the couplings to permit contraction or expansion of the conduit sections. It is not known to lock the sections together at the couplings by pin means, nor to anchor the conduit to the earth by such pin means, nor to take off fluid for irrigation purposes by such pin means.

Description

A bell 10 comprising a female coupler housing is adapted by sleeve 12 to receive and be joined to a conduit 14 inserted therein. The cross-section of the bell 10 is preferably greater than the cross-section of the conduit 14 to provide an enlarged internal chamber.

In the preferred form of the invention, bell 10 is provided with a pair of laterally protruding sleeves 16, 16 which are diametrically opposed to each other and which have a cross-section substantially reduced relative the internal cross-section of the bell.

On the end of another conduit 18 is a spigot 20 which is sized to closely slip into the open mouth of the bell 10. It is of sufficient length to be disposed between the openings of the lateral sleeves 16, 16. The spigot 20 has a pair of slots 22, 22 arranged with their length parallel to the longitudinal axis of the spigot 20 and of conduit 18. It can be seen, therefore, that when the spigot is disposed within the bell, slots 22, 22 lie in the axis of the openings of sleeves 16, 16.

While the fit between spigot 20 and the mouth of bell 10 may be very close, it is desirable that a sealing means 24 be included. A preferred form of such seal is that of an O-ring which is very effective to contain fluid under pressure, while at the same time accommodating relative longitudinal movement between the sleeve and the bell. Likewise there are shown fluid seal means 26, 26 within the sleeves 16, 16 operable in the same manner and for a similar purpose.

Referring to FIGURE 2, pin 30 is shown inserted through the sleeves 16 and passing through slots 22, 22 of spigot 20. This disposition of pin 30 secures the spigot within the bell and will prevent relative rotation between the bell and the spigot. A protrusion 32 on pin 30 may be impaled in the earth and thus preclude relative rotation between the bell-spigot assembly and with the earth. For earth impaling purposes the protrusion 32 may be pointed as at 34, or otherwise shaped so that earth impaling may be accomplished in easy manner.

Desirably pin 30, at least from within the bell-spigot assembly, is hollow and extends outward in opposition to the protrusion 32. Such hollow portion 36 has ports 38 that are preferably located within the spigot 20. This assembly is used for overhead irrigation purposes and fluid flowing in the conduits 14 and 18 may pass into the hollow interior of pin extension 36 on the upper end of which by means of a coupling 40 may be joined to a standpipe 42 that mounts a sprinkler head 44. Fluid seals 26, 26 preclude leakage around the pin 30 where it passes through sleeve 16, 16.

Practically, in the assembly as shown in FIGURE 2, the pin extension 32 may be 6 to 20 inches in length, the same depending upon the soil conditions into which it may be inserted. Also the riser extension may be from 3 or 4 inches in length up to a foot or more depending on the height above the coupler assembly at which it is desired to locate the coupling 40. The standpipe 42 may be anywhere from about 2 to 6 feet in length, this being governed by the elevation at which the sprinkler head is to operate.

It is to be observed that there are several advantages that flow from this invention. In the situation where the conduits 14 or 18 are formed of plastic pipe, it has been observed that as the same lie on the earth and are exposed to the heat of the sun they elongate and "grow" a surprising amount. Unless such tendency to elongate is accommodated it will be apparent that unusual forces are applied to standpipes and to the components of the irrigation system. Such forces may be destructive of the couplings and conduits or they may overturn the standpipes and thus eliminate the effectiveness of the fluid distribution heads that are employed. Elongation or contraction of the conduit is accommodated within the slip coupler by slots 22, 22 which permit the spigot to move relative the cross-pin 30.

In those instances where the cross-pin 30 has the protrusion 32 extending opposite from the riser 36, not only is the slip coupler anchored to the earth and relative rotation precluded, but also any standpipe carried by pin 36 is fixed in the earth and is not easily overturned or tilted. Further, by reason of the location of the ports 38, providing access to the hollow interior of pin portion 36, the diversion of fluid flowing through conduits 14 and 18 into the riser is very simply and effectively accommodated. Maintenance problems arising from the accumulation of silt and the like are also easily corrected. Where it is desired, a valving action is provided. Flow upward through the hollow interior of pin 36 may be precluded by disposing the ports 38 out of communication with the stream flowing through conduits 14 and 18. This may be accomplished by raising it slightly higher above the ground than when fluid flow is desired.

In FIGURE 4 an alternative slip coupler is shown. The bell body 50 has sleeves 56, 56 located to one side of its main axis to receive the upright conduit 52 in a non-symmetrical manner. Conduit 52 has a side port 54 by which fluid flows thereinto. The spigot 58 has an elongated notch forming a side port 60 to receive conduit 52. When ports 54 and 60 are registered fluid flowing spigot 58 passes into conduit 52. When the ports are longitudinally separated fluid flow is precluded. Such non-registry may be obtained by either up or down longitudinal movement of the conduit 52 relative spigot 58. Elongation of slot 60 permits longitudinal movement of spigot 58 relative the conduit 52.

It will be apparent that disassembly of a conduit-type surface irrigation system is readily available to the operator. Assuming a very long conduit assembly across a field, say, ¼ or ½ mile long and conduit sections in the neighborhood of 16 to 24 feet in length, all that an operator need do is to follow the line of conduit, withdraw the cross-pins. Then he can quickly separate the spigot and bell portions of the slip coupler. Upon transport of the conduits to a new location, the operator is reversed and the conduit sections reassembled and quickly placed in fluid distribution condition without the use of tools or any particular amount of skill.

Throughout the drawings the parts are cross-hatched merely to indicate structure. In the preferred form, this slip coupler may be molded of plastic materials. The conduits are commonly manufactured of plastic extrusion which may be cut and assembled upon the employment of adhesive materials or solvents effecting practical welds. Or the coupler parts may be in part cut from standard extrusions and in part molded of similar material. It will be obvious, of course, that the various parts of this slip coupler may likewise be manufactured from metal without materially departing from the invention,

I claim:
1. A slip coupler for irrigation conduit, and the like, comprising:
   a bell adapted to terminate a first conduit, and having an opposed pair of openings the cross-section of which are reduced relative the internal cross-section of said bell;
   a spigot sized to slip into said bell and adapted to terminate a second conduit, said spigot being of a length to be inserted into said bell sufficiently to intersect the opposed pair of openings;
   said spigot having openings substantially registrable with said bell openings; and
   a pin disposed in said openings when the same are in registry, said pin protruding from one side of said coupler sufficiently to impale the earth and preclude rotation of the coupler relative thereto, and said pin including an extension, hollow from within said spigot, opposite said earth-impaling protrusion, said hollow extension being ported for the passage of fluid into the extension from within the coupler, there being fluid distribution means at the outer end of said hollow extension.

2. The structure according to claim 1 in which the openings in said spigot are longitudinally elongated slots.

3. The structure according to claim 1 in which are fluid seals provided between the bell and the spigot and between the opposed openings and said pin.

4. A slip coupler for irrigation conduit, and the like, comprising:
   a pipe bell terminating a first conduit and having a pair of opposed openings, the cross-sections of which are reduced relative the internal cross-section of said bell;
   a spigot sized to slip into said bell and terminating a second conduit, said spigot being of a length to be inserted into said bell sufficiently to be disposed substantially between said opposed openings;
   fluid sealing means between said bell and said spigot;
   said spigot having opposed elongated port means registrable with said opposed openings;
   a hollow pin disposed in said openings being ported for fluid access to its interior when its port is disposed between the elongated port means of said spigot;
   fluid sealing means at said openings and surrounding said pin;
   said pin extending outward from said coupling on both sides thereof, and being adapted at one end to impale the earth and preclude rotation of the coupler relative thereto, said pin being hollow from within said spigot and extending outward in opposition to said earth impaling end and having fluid distribution means at the terminous of the hollow portion.

References Cited

UNITED STATES PATENTS 2,196,456  4/1940  Charroin _____ 239—276 X

FOREIGN PATENTS 6,588  10/1913  Great Britain.

M. HENSON WOOD, JR., *Primary Examiner.*

HOWARD NATTER, *Assistant Examiner.*

U.S. Cl. X.R.

239—276; 285—150, 190, 404